April 21, 1942.　　　F. R. GRANT ET AL　　　2,280,699

METHOD OF LAMINATING AND ADHESIVE

Filed Oct. 2, 1939

Francis Ralph Grant
Carl E. Wright
Inventors
Haynes and Koenig
Attorneys

Patented Apr. 21, 1942

2,280,699

UNITED STATES PATENT OFFICE 2,280,699

METHOD OF LAMINATING AND ADHESIVE

Francis Ralph Grant, El Dorado, and Carl E. Wright, Gurdon, Ark., assignors to Lion Oil Refining Company, El Dorado, Ark., a corporation of Delaware Application October 2, 1939, Serial No. 297,544

17 Claims. (Cl. 154—40)

This invention relates to adhesives, and with regard to certain more specific features, to water-soluble adhesives of the starchy type.

Among the several objects of the invention may be noted the provision of improved water-soluble starchy adhesives which, when used in conjunction with laminated materials (such as papers and fabrics and the like) secured together by bituminous adhesives, do not cause the laminae to come apart, or the bituminous adhesive to lose its tenacity; the provision of an adhesive of the class described which is simple and economical to manufacture; and to a method of laminating by the use of such adhesives. Other objects will be in part obvious and in part pointed out hereinafter.

The invention accordingly comprises the ingredients and combinations of ingredients, the proportions thereof, and features of composition, which will be exemplified in the products hereinafter described, and the scope of the application of which will be indicated in the following claims.

In the drawing, Fig. 1 is a cross-section of a laminated product prepared in accordance with the present invention;

In the manufacture of paper bags and the like, it is frequently desirable to use a laminated paper stock, the laminae of which are held together by a bituminous adhesive, because the bituminous adhesive waterproofs the laminated stock. However, such stock is usually pasted up into bag form with the use of water-soluble pastes, such as starch pastes and the like, and this has given rise to a considerable difficulty, because such water-soluble pastes, upon application to the outer lamina of the laminated stock, tend, for some reason, to cause the bituminous adhesive to lose its tenacity, whereupon the laminae separate or blister.

The adhesive of the present invention, however, for some reason not entirely understood, when used for such purposes, does not cause the bituminous adhesive to lose its tenacity; on the contrary, the bituminous adhesive retains its tenacity substantially unaffectedly, and the various laminae of the laminated stock remain securely adhered together even when the adhesive of the present invention is spread over wide areas of the laminated stock.

Figure 1:
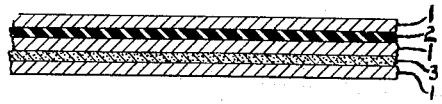

Referring now to the drawing, Fig. 1 shows a cross-section of a laminated product, in which two of the laminated layers 1 are joined together by an asphalt or bituminous adhesive 2. A third lamina has been joined to the other two by a layer of adhesive 3, prepared in accordance with the present invention.

Figure 2:
Fig. 2 is a cross-section of another type of laminated product.

Fig. 2 illustrates an alternative embodiment in which two sets of layers laminated by means of a bituminous adhesive, have been pasted together with the adhesive of the present invention. This form is typical of the circumstances encountered in the manufacture of paper bags or the like, in which a laminated stock prepared with a bituminous adhesive is pasted up into bag form with the adhesive of the present invention.

Figure 3:
Fig. 3 is a cross-section of a third embodiment of the present invention.

Fig. 3 illustrates a still further alternative form, in which a laminated stock prepared with a bituminous adhesive has had outer laminae added on each side, by means of the adhesive of the present invention.

In general, the adhesive of the present invention comprises a simple modification of any of the usual starchy adhesives, or pastes or glues; this includes particularly the so-called tapioca glues, flour paste, gluten paste, and the like. In accordance with the present invention, such adhesives, otherwise made up accordingly to standard formulae, are modified by the addition thereto of small proportions of a water-insoluble metallic soap, or a metallic soap which will form a water insoluble soap. Outstanding examples of such metallic soaps and salts which react with metallic soaps to form water insoluble soaps are the aluminum stearates and palmitates, the lead stearates and palmitates, the iron stearates and palmitates, and the respective aluminum lead and iron salts. Furthermore, the lignite soaps of these three metals, such as are formed by reacting salts of the metals with paper-mill sulphite waste liquors, are apparently also useful.

In general, the trivalent metallic soap is incorporated in the adhesive as it is mixed, and it may vary in amount over a wide range, say from a minimum of the order of one per cent, by weight, of the adhesive, to a maximum of the order of fifteen per cent.

Two satisfactory formulae are given below.

Example No. 1

| | Grams |
|---|---|
| Water | 100 |
| Ammonium hydroxide (concentrated) | 4 |
| Starch | 8 |
| Glycerine | 1 |
| Aluminum stearate | 1 |

The constituents are mixed to a homogeneous paste.

Example No. 2

| | Grams |
|---|---|
| Tapioca starch | 4 |
| Cold water | 8 |
| Boiling water | 64 |
| Aluminum stearate | 2 |

The paste or glue is made by mixing the starch and the cold water, and then adding the boiling water.

The addition of the metallic soaps appears not to be incompatible with the inclusion in the adhesives of such standard ingredients as hardening and preserving agents.

The adhesives prepared in accordance with the present invention can be used in the customary manner. Applied to bituminous-cement-laminated papers or fabrics, or the like, they produce substantially no blistering or other separation of the bituminous-cement-adhered laminae. In fact, using the adhesives of the present invention, further layers of paper or fabric or the like may even be satisfactorily and practically adhered to, or laminated to, a bituminous-cement-laminated stock; such a product was practically an impossibility in the prior art.

In view of the above, it will be seen that the several objects of the invention are achieved and other advantageous results attained.

As many changes could be made in the above products without departing from the scope of the invention, it is intended that all matter contained in the above description shall be interpreted as illustrative and not in a limiting sense.

We claim:

1. A water-containing adhesive of the starchy type including not substantially less than 1% of water-insoluble metallic soap.

2. A water-containing adhesive of the starchy type including not substantially less than 1% of a trivalent metal soap.

3. A water-containing adhesive of the starchy type including not substantially less than 1% of an aluminum soap.

4. A water-containing adhesive of the starchy type including not substantially less than 1% of an aluminum soap of the class consisting of stearates and palmitates.

5. A water-containing adhesive of the starchy type including not substantially less than 1% of a lead soap.

6. A water-containing adhesive of the starchy type including not substantially less than 1% of a lead soap of the class consisting of stearates and palmitates.

7. A water-containing adhesive of the starchy type including not substantially less than 1% of an iron soap.

8. A water-containing adhesive of the starchy type including not substantially less than 1% of an iron soap of the class consisting of stearates and palmitates.

9. A water-containing tapioca paste including not substantially less than 1% of a trivalent metal soap.

10. A water-containing tapioca paste including not substantially less than 1% of an aluminum stearate.

11. A water-containing adhesive of the starchy type including of the order of from one to fifteen per cent by weight of a trivalent metal soap.

12. The method of laminating a laminated product which comprises a plurality of laminated layers, at least two of which are joined together by a bituminous adhesive, which comprises bonding a lamina to the laminated product with a water-containing adhesive of the starchy type including not substantially less than 1% of water-insoluble metallic soap.

13. The method of laminating a laminated product which comprises a plurality of laminated layers, at least two of which are joined together by a bituminous adhesive, which comprises bonding a lamina to the laminated product with a water-containing adhesive of the starchy type including not substantially less than 1% of a trivalent metal soap.

14. The method of laminating a laminated product which comprises a plurality of laminated layers, at least two of which are joined together by a bituminous adhesive, which comprises bonding a lamina to the laminated product with a water-containing adhesive of the starchy type including not substantially less than 1% of an aluminum soap.

15. The method of laminating a laminated product which comprises a plurality of laminated layers, at least two of which are joined together by a bituminous adhesive, which comprises bonding a lamina to the laminated product with a water-containing adhesive of the starchy type including not substantially less than 1% of an aluminum soap of the class consisting of stearates and palmitates.

16. The method of laminating a laminated product which comprises a plurality of laminated layers, at least two of which are joined together by a bituminous adhesive, which comprises bonding a lamina to the laminated product with a water-containing adhesive of the starchy type including not substantially less than 1% of a lead soap.

17. The method of laminating a laminated product which comprises a plurality of laminated layers, at least two of which are joined together by a bituminous adhesive, which comprises bonding a lamina to the laminated product with a water-containing adhesive of the starchy type including not substantially less than 1% of an iron soap.

FRANCIS RALPH GRANT.
CARL E. WRIGHT.